(12) United States Patent
Potier et al.

(10) Patent No.: US 12,498,018 B2
(45) Date of Patent: Dec. 16, 2025

(54) BACKLASH REDUCTION IN EPICYCLIC GEARS

(71) Applicant: Goodrich Actuation Systems SAS, Vernon (FR)

(72) Inventors: Karl Potier, Paris (FR); Maxime Serrand, Paris (FR)

(73) Assignee: GOODRICH ACTUATION SYSTEMS SAS, Vernon (FR)

( * ) Notice: Subject to any disclaimer, the term of this patent is extended or adjusted under 35 U.S.C. 154(b) by 0 days.

(21) Appl. No.: 19/052,838

(22) Filed: Feb. 13, 2025

(65) Prior Publication Data
US 2025/0283523 A1    Sep. 11, 2025

(30) Foreign Application Priority Data
Mar. 11, 2024    (EP) .................................... 24305368

(51) Int. Cl.
*F16H 1/28* (2006.01)
(52) U.S. Cl.
CPC .................................. *F16H 1/2863* (2013.01)
(58) Field of Classification Search
CPC ............................. F16H 1/2863; F16H 57/082
See application file for complete search history.

(56) References Cited

U.S. PATENT DOCUMENTS

| | | | |
|---|---|---|---|
| 10,036,450 B2 * | 7/2018 | Chhour | F16H 57/082 |
| 10,859,138 B2 * | 12/2020 | Felisa | F16H 1/2863 |
| 11,131,248 B2 * | 9/2021 | Kallianteris | F02C 7/36 |
| 11,440,181 B2 | 9/2022 | Lindblom | |
| 2018/0073598 A1 * | 3/2018 | Pluta | F01L 1/352 |
| 2023/0301850 A1 | 9/2023 | Maekawa | |

FOREIGN PATENT DOCUMENTS

| | | |
|---|---|---|
| DE | 102014117646 A1 | 6/2016 |
| EP | 2607695 A1 | 6/2013 |
| EP | 3076045 A1 | 10/2016 |
| JP | 2018105336 A | 7/2018 |

OTHER PUBLICATIONS

European Search Report for Application No. 24305368.3, mailed Aug. 14, 2024, 12 pages.

* cited by examiner

*Primary Examiner* — Huan Le
(74) *Attorney, Agent, or Firm* — CANTOR COLBURN LLP

(57) ABSTRACT

An epicyclic gear assembly includes: a sun gear rotatable about an axis (A); a plurality of planetary gears arranged around and in meshing engagement with the sun gear such that rotation of the sun gear about its axis causes corresponding rotation of each of the planetary gears about their own axes; and an outer ring gear arranged around and in meshing engagement with the plurality of planetary gears such that rotation of the planetary gears causes rotation of the outer ring gear about the axis A and relative to the fixed outer rings. The assembly also includes a backlash reduction mechanism between the planetary gears and the outer ring gear. The backlash reduction mechanism includes a planetary gear carrier with a plurality of carrier segments each carrying a respective one of the planetary gears, the segments together defining an annular carrier having a bore therethrough.

11 Claims, 6 Drawing Sheets

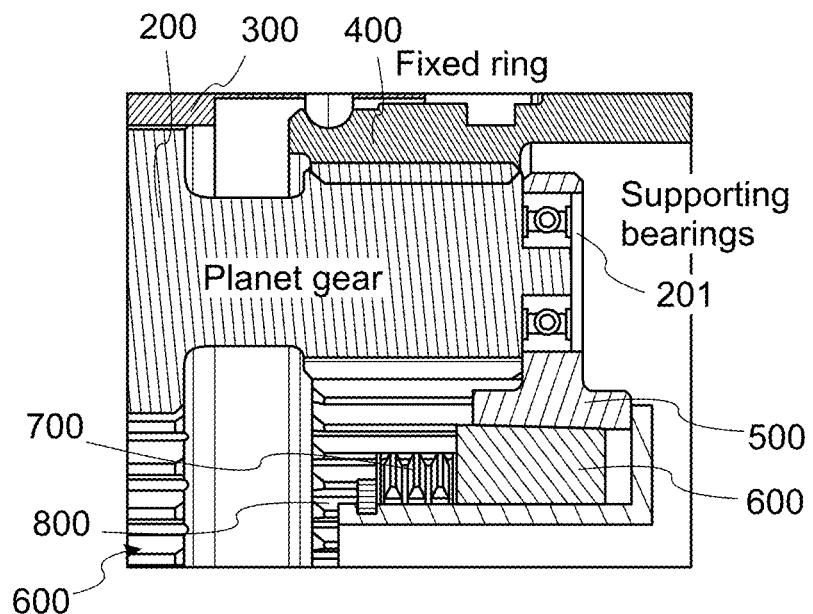
FIG. 3
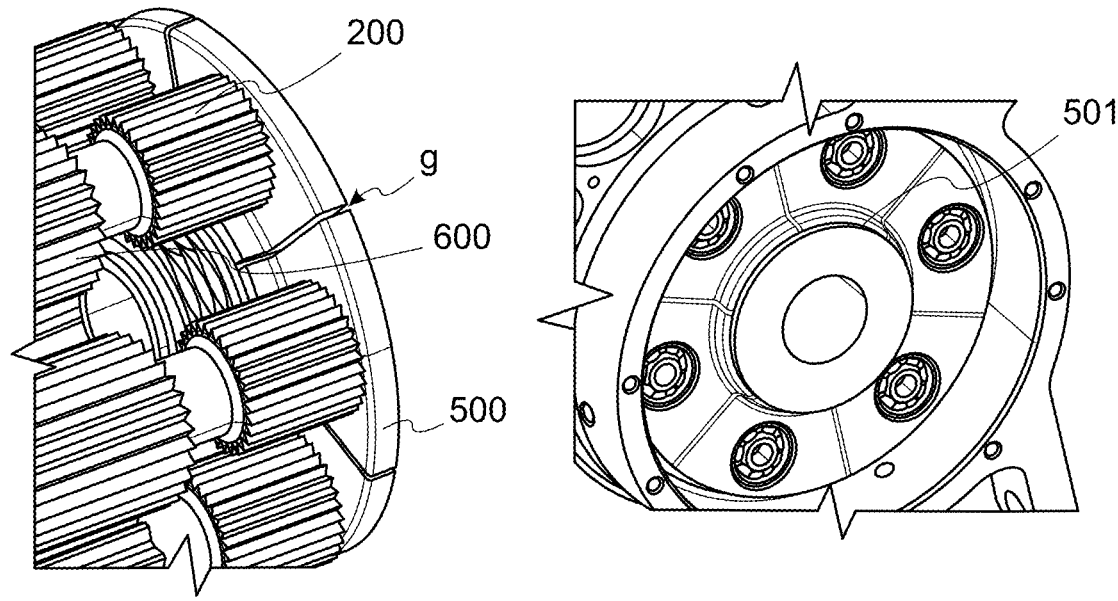
FIG. 4
FIG. 5

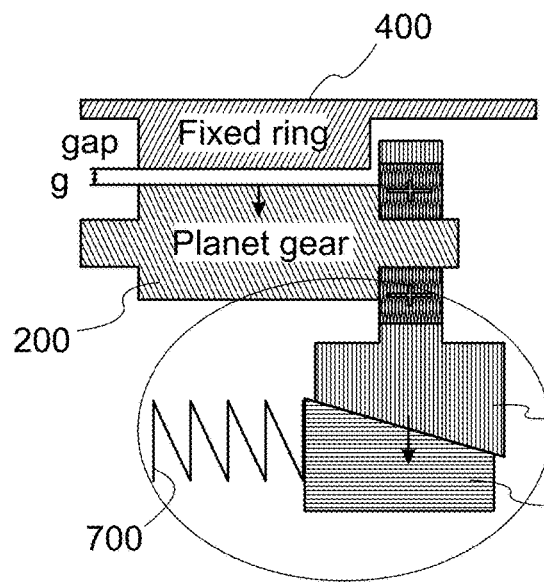
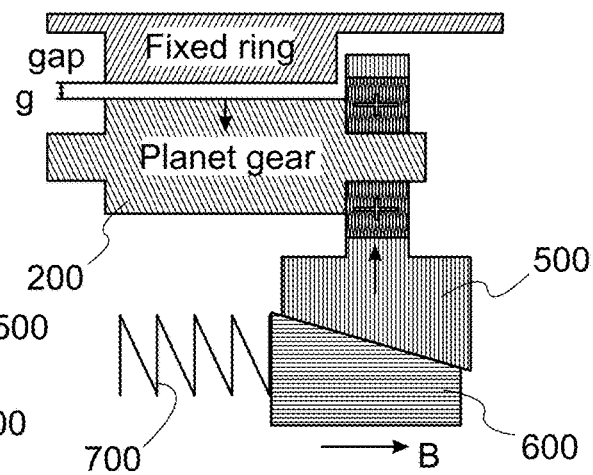
FIG. 8A  FIG. 8B
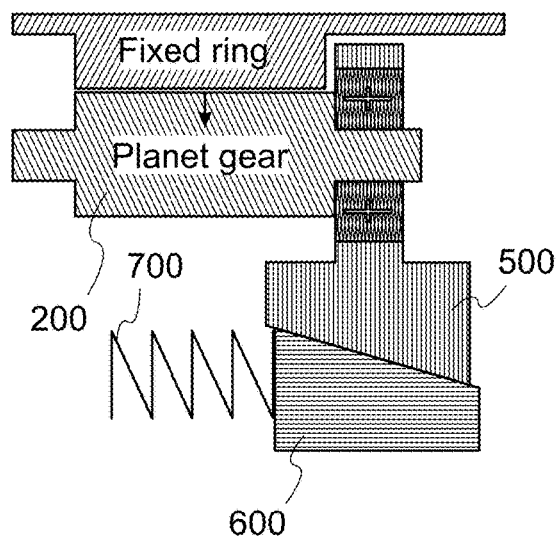
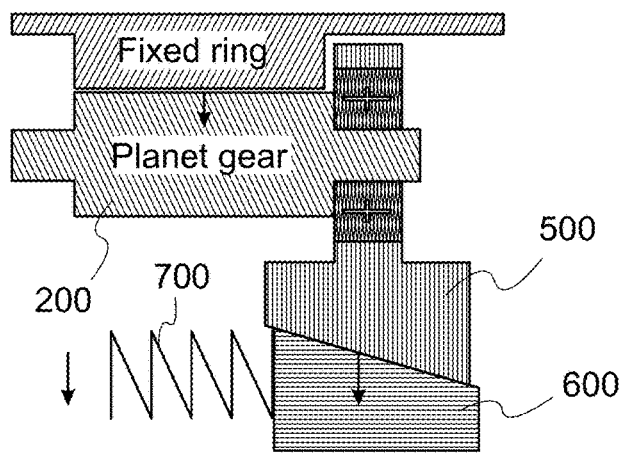
FIG. 8C  FIG. 8D

BACKLASH REDUCTION IN EPICYCLIC GEARS

CROSS-REFERENCE TO RELATED APPLICATIONS

This application claims the benefit of European Patent Application No. 24305368.3 filed Mar. 11, 2024, the disclosure of which is incorporated herein by reference in its entirety.

TECHNICAL FIELD

The present disclosure relates to epicyclic gear assemblies and, more specifically, to reducing backlash in such assemblies.

BACKGROUND

Epicyclic gear assemblies including a sun gear around which planetary gears rotate, find use in many applications where high power is required to drive a load. Rotary electromechanical actuators, for example, typically include epicyclic gear assemblies which are able to transmit high power. A problem that can arise with such gear assemblies is that backlash can arise. Backlash is when relative rotation occurs between gears without the gear teeth engaging. Whilst there will always be a small amount of backlash because the teeth will always have to be a bit smaller than the valley in which they mesh to avoid jamming, too much backlash can lead to gear inefficiencies and inaccurate gear operation. This can have serious consequences in safety-critical applications such as in controlling aircraft flight control surfaces. Backlash will increase over the life of the gear assembly as the gear teeth wear. Whilst backlash can be addressed by improving gear profile grades, this is expensive and, in any case, even with higher grades, wear will occur and cause backlash.

The area of most concern as regards backlash is between the planetary gears and the outer fixed rings of gear assemblies. Typically, backlash between the planetary gears and the sun gears is similar, but due to the different gear ratio, the effective backlash at output level is negligible and so of less concern.

Some epicyclic or compound gear assemblies use guiding rings fitted between the sun gear and the planetary gears which serve to compensate radial loads on the planetary gears to prevent those loads being transmitted to the sun gear. The guiding rings may also provide some backlash reducing effect.

Alternatively, the guiding rings could be replaced by radial springs to urge the planetary gears towards the rings. Such springs, however, would have to be pre-loaded with at least the maximum operating load, which means that the gear teeth would always be highly loaded. This would adversely affect the life of the assembly.

There is, therefore, a need for a solution to the problem of backlash in such gear assemblies that overcomes these problems.

SUMMARY

According to this disclosure, there is provided an epicyclic gear assembly comprising: a sun gear rotatable about an axis; a plurality of planetary gears arranged around and in meshing engagement with the sun gear such that rotation of the sun gear about its axis causes corresponding rotation of each of the planetary gears about their own axes; and an outer ring gear, located axially between two fixed outer rings, the outer ring gear arranged around and in meshing engagement with the plurality of planetary gears such that rotation of the planetary gears causes rotation of the outer ring gear about the axis A and relative to the fixed outer rings; the assembly further comprising: a backlash reduction mechanism between the planetary gears and the outer ring gear, the backlash reduction mechanism comprising: a planetary gear carrier comprising a plurality of carrier segments each carrying a respective one of the planetary gears, the segments together defining an annular carrier having a bore therethrough; a mechanical cam supported within the bore and having a cam profile interfacing with the carrier; and a spring biasing the mechanical cam relative to the carrier in the bore; wherein the cam is designed to have a cam angle such that the cam is held in frictional engagement with the carrier when the induced load from the planetary gears is less than the friction at the interface between the carrier and the cam, and wherein the cam moves relative to the carrier under the force of the spring when the induced load between the carrier and the cam exceeds the friction.

The planetary gear segments may be arcuate segments together forming an annular circular carrier.

A gap may be formed between each adjacent carrier segment.

The cam profile may be a ramp sloping in the axial direction.

The bore may have an inner profile corresponding to the cam profile.

The spring may be a mechanical spring, e.g. a wave spring.

A retainer may be provided at an end of the spring distal from the cam.

The planetary gears may be attached to the respective carrier segment via support bearings.

A backlash reduction mechanism may be provided at both ends of the gear assembly.

Teeth of one or more of the planetary gears may be formed with a chamfered surface.

BRIEF DESCRIPTION OF THE DRAWINGS

Examples of the gear assembly according to this disclosure will be described with reference to the drawings. It should be noted that these are examples only, and that variations are possible within the scope of the claims.

FIG. 3 is a partial view of an epicyclic gear assembly modified according to this disclosure to manage backlash.

FIG. 4 is a 3D inside view of an end of a gear assembly modified as shown in FIG. 3.

FIG. 5 is an end view of a gear assembly such as shown in FIG. 4.

FIGS. 8A to 8D are provided to explain the operation of a gear assembly modified according to this disclosure to reduce backlash.

DETAILED DESCRIPTION

In the present gear assembly, the radial position of the planetary gears is adjusted responsive to a change in radial load on the planetary gear, so that as a gap is created between the planetary gears and the outer ring, causing a change in induced load from the planetary gears, a backlash reduction mechanism acts to compensate the change and close the gap.

Figure 1:
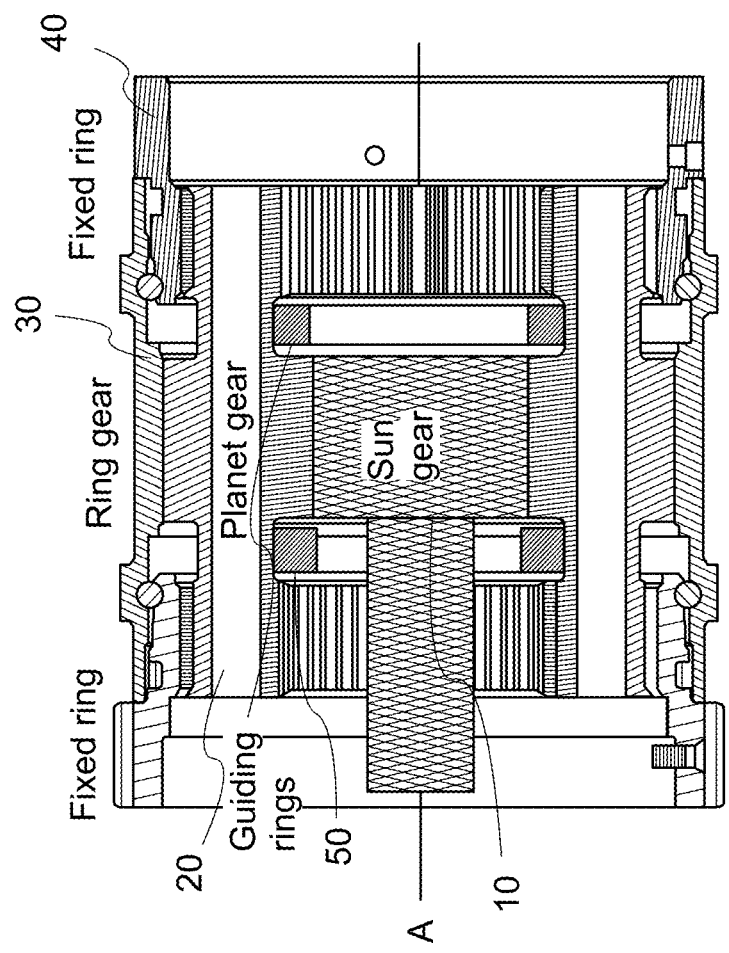
FIG. 1 shows a known compound gearbox with guiding rings.

FIG. 1 is a simple sectional view of a conventional epicyclic gear assembly having a central sun gear 10 that rotates about an axis A. Planetary gears 20 are arranged coaxially around the sun gear 10 and an outer ring gear 30 arranged around the planetary gears 20. Typically, the sun gear 10 is connected to an input shaft such that as the input shaft is rotated, the sun gear rotates about its axis. As it rotates, the sun gear meshes with the planetary gears to cause rotation of the planetary gears about their own axes. The planetary gears are arranged to mesh with the outer ring 30 such that rotation of the planetary gears causes rotation of the outer ring 30 about axis A. Fixed rings 40 are mounted either side of the outer ring. The outer ring therefore rotates relative to the fixed ring. In use, typically, the output ring is fixed to a part or component to be moved responsive to movement of the input shaft at a relative rate of rotation set by the gear ratio.

Figure 2:
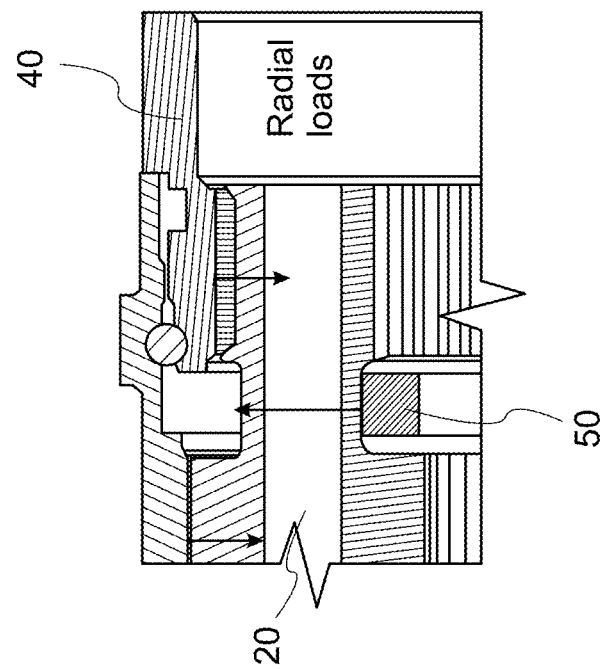
FIG. 2 is a close up view of the guiding ring of FIG. 1.

As mentioned above, and as is known, the gears mesh by teeth on their outer surfaces and backlash may occur, particularly as the gears wear, such that the play between gears increases over time. In one design, shown in FIG. 1, and in close-up in FIG. 2, guiding rings 50 are fitted around the sun gear to compensate for radial loads on the planetary gears. The guiding rings 50 act to damp radial loads from the planetary gears to avoid such loads being transmitted to the sun gear. The direction of the loads is indicated by arrows in FIG. 2. Such rings may also have some effect on backlash.

The present disclosure provides an improved backlash reduction mechanism as will be described with reference to FIGS. 3 to 8.

The backlash reduction mechanism is shown in cross-section in FIG. 3 and in 3D views from inside and from outside, respectively, in FIGS. 4 and 5. The backlash reduction mechanism will be described as mounted at one side of the gear assembly but corresponding components may be provided at the opposite side. Having the mechanism at each side balances the gear box and avoids/reduces tilt.

FIG. 3 shows a partial view of the gear assembly, showing one side of an epicyclic gear assembly comprising the known parts of planetary gears 200 which rotate around a sun gear (the sun gear is not shown in these Figs but will correspond to the sun gear of FIG. 1). As with the assembly described above with reference to FIG. 1, an outer ring gear 300 is provided around the planetary gears and between fixed rings 400. The backlash reduction mechanism, as will be described further below, is configured to maintain the optimal radial spacing of the planetary gears 200 relative to the fixed ring 400.

The backlash reduction mechanism comprises a planet carrier 500 comprising a plurality of planet carrier segments 500a, each attached to an end of a respective planetary gear 200, e.g. via support bearings 201. The segments 500a together form a substantially circular annular end surface of the gear assembly. The segments may be substantially arcuate and may be wire-cut, for precision. A small clearance gap g is formed between adjacent segments. The segments have radially inner edges 501 that together define a bore. The backlash reduction mechanism further comprises a mechanical cam 600 extending axially into the bore defined by the segment edges 501. The mechanical cam 600 is held in place in the bore by means of a spring e.g. a wave spring 700 or other mechanical spring, that abuts against an axially inner end of the mechanical cam 600. A retainer 800 may be provided to abut against and support the other end of the spring 700.

The mechanical cam 600 has a cam profile on its outer surface, the purpose of which will be described further below, with reference to FIGS. 6 to 8. The profile may be in the form of a ramp sloping in the axial direction from a maximum radial dimension at the end adjacent the spring to a minimum radial dimension at the other end, as best seen in FIGS. 6 to 8.

The bore defined by the planetary carrier may have a corresponding profile on its inner surface for engagement with the cam as described further below.

Figure 6:
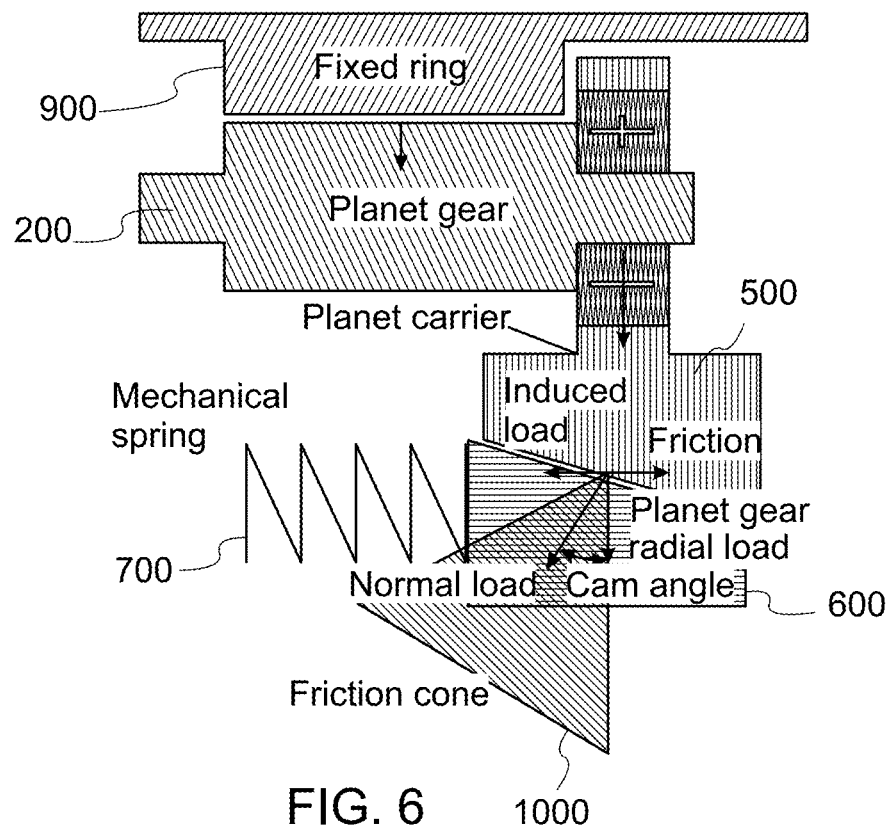
FIG. 6 is a schematic view of the gear assembly modified according to this disclosure in a first condition.
Figure 7:
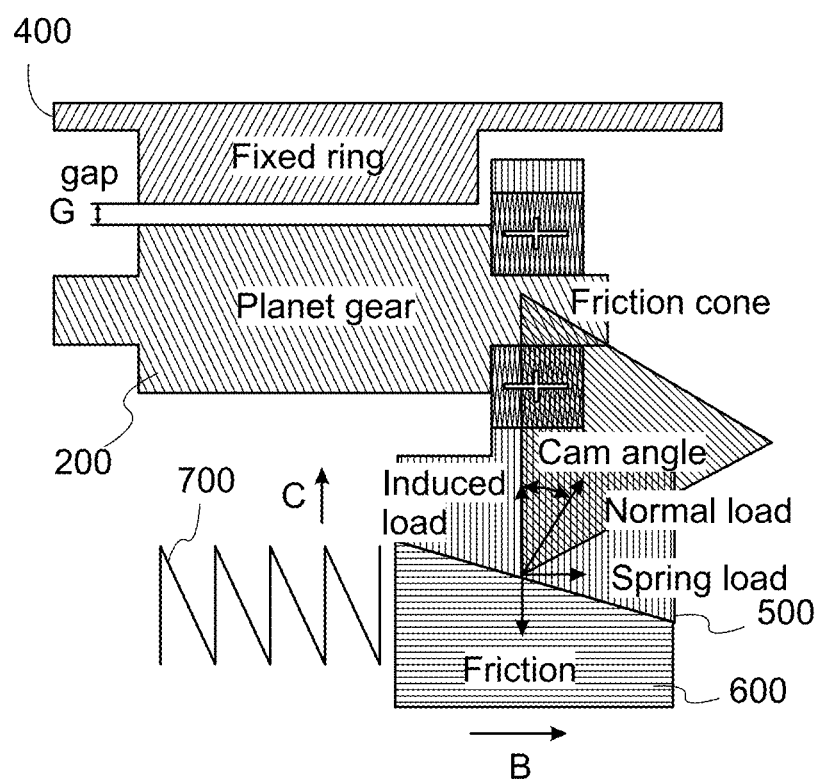
FIG. 7 is a schematic view of the gear assembly modified according to this disclosure in a second condition.

FIG. 6 shows an assembly such as shown in FIGS. 3 to 5 as a schematic view, showing the planetary gear 200 and fixed ring 400. The planetary gear 200 is attached to a respective segment 500a of the planet carrier 500. The mechanical cam 600 is mounted in the bore defined by the carrier 500 and is biased in position by the spring 700. In FIG. 6, in the normal operation of the gear, the angle of the cam profile and the interfacing angle of the planet carrier are such that the angled opposing surfaces of the cam and the carrier abut and lie along each other. A conical effect of friction (friction cone) 1000 is formed based on a cam angle based on the induced load from the planetary gear, the radial load on the cam and the friction between the carrier and the cam, as indicated by the arrows in FIG. 6.

A radial load of the planetary gear acts in a perpendicular direction from the planetary gear 200, via the carrier 500, on the cam 600. A frictional load between the carrier and the cam acts in one direction and the induced load in the opposite direction is also shown.

The mechanical cam supporting the planet carrier has a small angle e.g. 2 deg.+/−0.5 deg to ensure that there is no relative sliding between the carrier and the cam under radial loads of the gears—i.e. so that the interaction is not reversible. In other words, the planet carrier cannot move radially if the planet gear radial load remains within the friction cone—i.e. if the induced load is less than the friction.

This is the case when the cam angle is greater than the tan of the coefficient of friction.

For example, for a cam angle equal to 2 deg.+/−0.5 deg, the planet carrier can never move if the coefficient friction is greater than the tan of the cam angle.

The spring 700 and the interaction between the cam and the carrier work to close any gap G that is created between the planetary and ring gears. This can be described with reference to FIG. 7. As the gap G increases, the induced load will exceed the friction which changes the friction cone such that the radial load is now outside the friction cone and the cam can move axially relative to the carrier. The spring 700 bias can then push the cam 600 axially relative to the carrier. Because of the angle of the interfacing surfaces, movement of the cam in direction B pushes the planet carrier radially outwards (direction C) thus moving the connected planetary gears 200 radially outwards and closer to the ring gears, closing the gap G.

It can be seen, therefore, that the cam angle is chosen to be as small as possible, within the possibilities of the manufacturing process, to make it non-reversible—i.e. to ensure that no radial load from the planetary gears can generate axial movement of the cam relative to the carrier. So long as the friction coefficient between the cam 600 and the carrier exceeds the induced load (i.e. exceeds tan cam angle), regardless of how high the radial load is, the cam will not slide relative to the carrier. Also, having a small cone angle means that a relatively light spring 700 can be used to radially move the planetary gears to close the gap and prevent/reduce backlash.

Operation of the mechanism will be further described with reference to FIGS. 8A and 8D.

FIG. 8A sows the situation where the gears are loaded, i.e. being driven, while a gap G exists between the planetary gears and the outer ring gear. The mechanical cam holds the planet carrier radially.

If the motor stops and the gear is, therefore, unloaded while a gap G exists (FIG. 8B). The frictional load from the planet gear therefore reduces which means that the force of the spring exceeds the friction and, therefore, pushes the cam 600 in direction B relative to the planet carrier 500. The movement of the radially higher part of the cam pushes under the carrier urging the carrier and, therefore, the planetary gear connected thereto (FIG. 8C) radially outwards to close the gap. If, then, the gears are loaded (i.e. driven), thus adding load, the mechanical cam will continue to hold the planet carrier and so hold the planetary gear in engagement with the outer ring (FIG. 8D).

Figure 9:
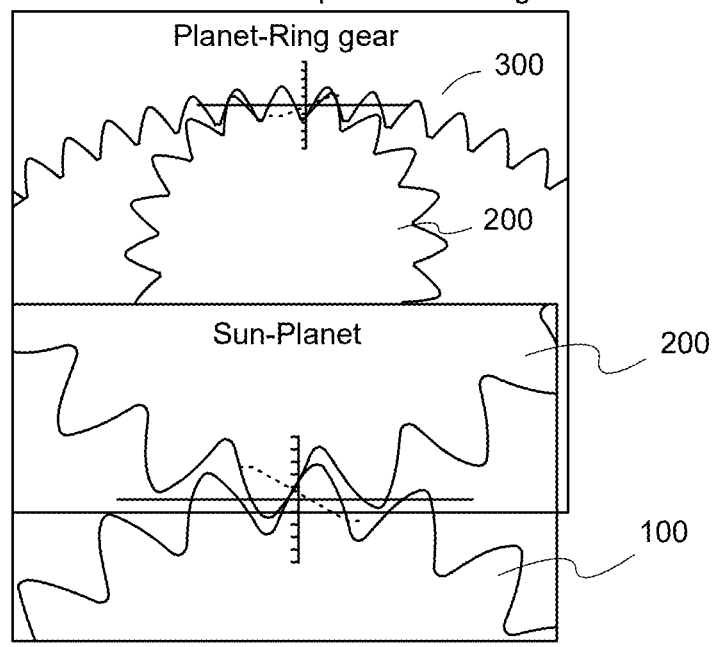
FIG. 9 is provided to explain a possible issue with loss of teeth contact.
Figure 10:
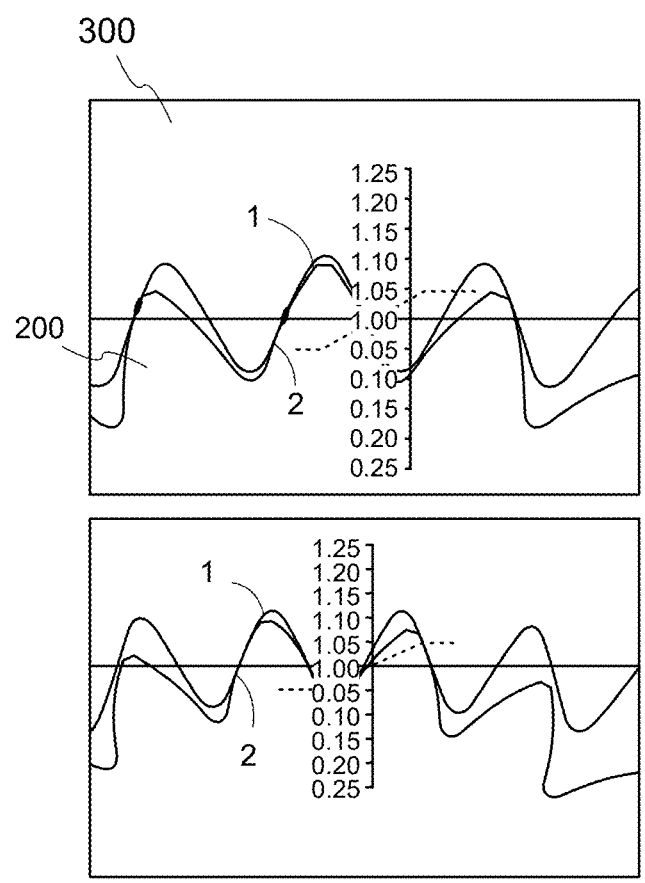
FIG. 10 is provided to explain a possible solution to the problem described with reference to FIG. 9.

One point to note is that when the planetary gears are at their nominal radial position (or 'centre' distance), without wear and backlash prevention, there is always at least one point of contact between the planet and the ring gear. If, however, the centre distance is increased to close the gap with the backlash reduction mechanism as described below, interference may occur between the tips of the teeth of the planetary gears and the outer ring gear teeth. This can lead to 'hard points' or, worse, a jamming of the gearbox (see FIG. 9). A possible solution to this problem may be to provide a small chamfer 2 on the teeth such that, when the centre distance is increased, even when having contact on one side, contact remains on the opposite (e.g. the loaded) side of the tooth (see FIG. 10) to avoid such interference.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. An epicyclic gear assembly comprising:
   a sun gear rotatable about an axis (A);
   a plurality of planetary gears arranged around and in meshing engagement with the sun gear such that rotation of the sun gear about its axis causes corresponding rotation of each of the planetary gears about their own axes; and
   an outer ring gear, located axially between two fixed outer rings, the outer ring gear arranged around and in meshing engagement with the plurality of planetary gears such that rotation of the planetary gears causes rotation of the outer ring gear about the axis (A) and relative to the fixed outer rings; and
   a backlash reduction mechanism between the planetary gears and the outer ring gear, the backlash reduction mechanism comprising:
   a planetary gear carrier comprising a plurality of carrier segments each carrying a respective one of the planetary gears, the segments together defining an annular carrier having a bore therethrough;
   a mechanical cam supported within the bore and having a cam profile interfacing with the carrier; and
   a spring biasing the mechanical cam relative to the carrier in the bore;
   wherein the mechanical cam has a cam angle such that the cam is held in frictional engagement with the carrier when an induced load from the planetary gears is less than the friction at the interface between the carrier and the cam, and wherein the cam moves relative to the carrier under a force of the spring when the induced load between the carrier and the cam exceeds the friction.

2. The assembly of claim 1, wherein the plurality of carrier segments are arcuate segments together forming an annular circular carrier.

3. The assembly of claim 1, wherein a gap is formed between each adjacent carrier segment.

4. The assembly of claim 1, wherein the cam profile is a ramp sloping in an axial direction.

5. The assembly of claim 1, wherein the bore has an inner profile corresponding to the cam profile.

6. The assembly of claim 1, wherein the spring is a mechanical spring.

7. The assembly of claim 6, wherein the spring is a wave spring.

8. The assembly of claim 1, further comprising:
   a retainer at an end of the spring distal from the cam.

9. The assembly of claim 1, whereby the planetary gears are attached to the respective carrier segment via support bearings.

10. The assembly of claim 1, having a first backlash reduction mechanism at a first end of the gear assembly and a second backlash reduction mechanism at a second end of the gear assembly.

11. The assembly of claim 1, wherein teeth of one or more of the planetary gears are formed with a chamfered surface.

* * * * *